United States Patent [19]
Ermacora et al.

[11] Patent Number: 5,199,250
[45] Date of Patent: Apr. 6, 1993

[54] HARVESTING MACHINE HAVING AN ORIENTATION ELEMENT

[75] Inventors: Rino Ermacora, St Jean Saverne; Bernard Wattron, Haegen, both of France

[73] Assignee: Kuhn, S.A., Saverne Cedex, France

[21] Appl. No.: 790,767

[22] Filed: Nov. 12, 1991

[30] Foreign Application Priority Data

Nov. 12, 1990 [FR] France .................. 90 14185

[51] Int. Cl.[5] ........................................... A01D 34/66
[52] U.S. Cl. ..................... 56/15.2; 56/15.5; 56/DIG. 14
[58] Field of Search ............. 56/15.2, 15.5, 15.9, 56/6, 14.9, 15.1, 380, 396, DIG. 14

[56] References Cited

U.S. PATENT DOCUMENTS

| | | | |
|---|---|---|---|
| 3,058,243 | 10/1962 | McGee | 37/145 |
| 4,573,309 | 3/1986 | Patterson | 56/228 |
| 4,682,462 | 7/1987 | Johnson, Sr. | 56/228 |
| 4,723,396 | 2/1988 | Ermacora | 56/13.6 |
| 4,768,334 | 9/1988 | Honey et al. | 56/228 |
| 4,858,418 | 8/1989 | von Allwoerden | 56/15.2 X |
| 4,991,383 | 2/1991 | Ermarcora | 56/14.9 |
| 5,060,462 | 10/1991 | Helfer et al. | 56/15.3 X |
| 5,107,663 | 4/1992 | Wattron et al. | 56/DIG. 10 X |

FOREIGN PATENT DOCUMENTS

| | | |
|---|---|---|
| 1164222 | 3/1984 | Canada . |
| 0161466 | 11/1985 | European Pat. Off. . |
| 1738047 | 1/1957 | Fed. Rep. of Germany . |
| 1172463 | 3/1958 | Fed. Rep. of Germany . |
| 1582356 | 4/1970 | Fed. Rep. of Germany . |
| 1187344 | 11/1957 | France . |
| 2376611 | 1/1978 | France . |
| 2082436 | 3/1982 | United Kingdom . |

*Primary Examiner*—Terry Lee Melius
*Attorney, Agent, or Firm*—Oblon, Spivak, McClelland, Maier & Neustadt

[57] ABSTRACT

A harvesting machine comprises a body which rests on the ground both in a work position and in a transport position through at least one wheel connected directly or indirectly to the body. The harvesting machine includes an orientation element used to orient the wheel in a direction of transport. The orientation of the wheel for the purpose of transport is performed in a simple and quick manner, while allowing, during work, the pivoting of the wheel around its shaft connecting it to the body.

41 Claims, 8 Drawing Sheets

HARVESTING MACHINE HAVING AN ORIENTATION ELEMENT

BACKGROUND OF THE INVENTION

1. Field of the Invention

The present invention relates to a harvesting machine which comprises a body resting on the ground both in the work position and in the transport position through at least one wheel connected directly or indirectly to the body by a first joint having an upwardly directed axis, the pivoting of the wheel around the axis being capable of being stopped by a first locking means; and a connecting means intended, at least at work, to be connected rigidly to a motor vehicle to which the body is connected with a connecting device which comprises a second joint having an upwardly directed axis, the pivoting of the body around the axis being capable of being stopped by a second locking means. The body being able to be brought from a work position, in which its longitudinal axis extends crosswise to the direction of work, into a transport position, in which its longitudinal axis extends at least approximately parallel to the direction of transport.

At work, the second locking means stops the pivoting of the body around the axis of the second joint, while the wheel is capable to be pivoted around the axis of the first joint, and during transport, the first locking means stops the pivoting of the wheel around the axis of the first joint, while the body is capable to be pivoted around the axis of the second joint.

2. Description of the Related Art

Patent application GB-2 082 436 or FR-2 489 080, shows a connecting device making it possible to hitch, laterally, a corn pick-up with a three-point hitch behind a tractor. This connecting device comprises a connecting part, connected rigidly to the tractor, as well as a side member which is connected, at one of its ends, to the connecting part by a vertical shaft. At its other end, the side member rests on the ground by a wheel mounted to pivot around a vertical shaft.

At work, the pivoting of the side member relative to the connecting part is stopped by a locking device, while the wheel is able to pivot around its vertical shaft connecting it to the side member.

On the contrary, during transport, the side member is able to pivot around the vertical shaft connecting it to the connecting part, while the pivoting of the wheel is stopped by a pin.

Taking into account the fact that the machine rests on the ground, both in its work position and in its transport position by at least one wheel, the hitching device of the tractor is not very stressed. The tractor is therefore more stable.

Further, during transport, the stationary wheel and the side member pivoting relative to the tractor substantially facilitate the maneuvers.

Moreover, at work, the side member that is stationary relative to the connecting part, itself connected rigidly to the tractor, makes the side member integral with the tractor, which considerably simplifies the maneuvers.

However, this machine exhibits a drawback. Actually, when the user wishes to bring the wheel from its work position into its transport position, manually or by maneuvering with the tractor, he should proceed cautiously to end with precision at the transport position in which he can stop the pivoting of the wheel by the pin. Given the extent of the weight of the machine, such a maneuver is very restricting and requires a relatively long time.

SUMMARY OF THE INVENTION

Accordingly, an object of the present invention is to remedy the above drawback while maintaining the dual advantage of barely stressing the hitching device of the motor vehicle and exhibiting a good maneuverability of the machine, both at work and during transport.

For this purpose, it is provided according to the invention that the harvesting machine in addition comprises an orientation means for orienting for the transport of the harvesting machine, the wheel in the direction of transport.

Due to the orientation element, the orientation of the wheel for the purpose of transport is performed in a simple and quick manner, while allowing, during work, the pivoting of the wheel around its shaft connecting it to the body.

According to an additional characteristic of the harvesting machine according to the invention, it is provided that the axis of the first joint is at least approximately parallel to the axis of the second joint.

According to a further characteristic of the invention, it is also provided that the connecting device comprises an third joint with an axis directed at least approximately orthogonally to the axis of the second joint and to the longitudinal axis of the body.

In one embodiment, it is provided that the third joint extends between the body and the second joint. In a further embodiment, the axis of the second joint and the axis of the third joint can be concurrent.

According to a further characteristic of the invention, it is provided that the pivoting of the body from its transport position to its work position, around the axis of the second joint, is performed under the action of a maneuvering means. This maneuvering means constitutes, at least partly, the second locking means that can stop the pivoting of the body around the axis of the second joint.

According to an additional characteristic of the invention, it is provided that the connecting means comprise a hitching structure with a three-point hitch intended to be connected to the three points of the hitching device of a motor vehicle.

The wheel extends in its work position behind at least one part of the work elements.

The passage of the wheel from a work position into a transport position is performed by a positioning element. The latter positions the wheel, for the purpose of transport, at least approximately in the longitudinal extension of the body.

The positioning element can comprise an arm at one of the ends by which the wheel is connected by the first joint, this arm itself being connected to the body by a fourth joint with axis directed upward.

In a further embodiment, the axes of the first, second and fourth joints can be at least approximately parallel to one another. Moreover, the axis of the fourth joint, connecting the positioning arm to the body, can extend, in top view, behind the longitudinal axis of the body when the latter is in its work position. In particular, the positioning arm can form, in top view, an acute angle with the longitudinal axis of the body when the latter is in transport position and an at least an approximately right angle with the longitudinal axis of the body when the latter is in the work position.

According to a further characteristic of the invention, it is provided that the pivoting of the positioning arm from its transport position toward its work position, around the axis of the fourth joint, is performed under the action of a positioning means.

According to a further characteristic of the invention, it is provided that a control device controls the maneuvering means and the positioning means. For this purpose, the control device can comprise two inverters, each equipped with a respective control element. The first inverter is fed by a common circuit and can occupy two separate positions:

- a first position in which it feeds the feed circuit of the second inverter; and
- a second position in which it feeds the circuit of the positioning means;

The second inverter can also occupy two separate positions:

- a first position in which it feeds the circuit of the positioning means; and
- a second position in which it feeds the circuit of the maneuvering means.

Moreover, a first end-of-travel element is provided to act directly or indirectly on the control element of the first inverter and a second end-of-travel element is provided to act directly or indirectly on the control element of the second inverter.

Of course, the distribution part and/or the control part of each inverter of the control device, as well as the maneuvering means and the positioning means can be, at least partly, electric, mechanical, hydraulic, etc. Thus, in particular, it is perfectly possible to use switches in combination with electric actuators, hydraulic inverters with electrical control, etc.

The first end-of-travel element can, when the body reaches its work position, act on the control element of the first inverter and place the first inverter in its second position.

Further, when the positioning arm leaves its transport position, the second end-of-travel element no longer acts on the control element of the second inverter, and the second inverter then takes its place in its second position.

To do this, the second end-of-travel element can, in some embodiments, be connected to the positioning arm. Further, a compensation element is provided making it possible for the positioning arm to continue its travel to the transport position after the second end-of-travel element is in contact with the control element of the second inverter. This compensation element can consist of an elastically deformable element placed between the second end-of-travel element and the positioning arm.

According to a further characteristic of the invention, it is also provided that the orientation means forms part of the first locking means intended to stop the pivoting of the wheel around the axis of the first joint.

The orientation means of the wheel can comprise a lever, pivoting around a swivel pin, which exhibits two stops extending on both sides of the swivel pin and intended to come into contact with an element of the body under the action of a positioning means.

In this case, the contact between the pivoting lever and the element of the body can be achieved by a roller rotating around a pin that is at least approximately parallel to the swivel pin of the pivoting lever.

Advantageously, the swivel pin of the pivoting lever can extend at least approximately in the same direction as the axis of the first joint.

Further, it is provided in the embodiment, where the positioning element consists of an arm, that the orientation element of the wheel is intended to come into contact with an element of the body when the arm comes to its transport position.

According to the invention, the pivoting lever can be connected to the positioning arm in the vicinity of the fourth joint connecting the positioning arm to the body. This pivoting lever also comprises an arm to which is connected a connecting rod, which is connected to an orientation arm which is connected to a journal whose longitudinal axis defines the axis of the first joint.

In an embodiment of the harvesting machine according to the invention, it is provided that the maneuvering means is an actuator, that being able to be, as stated above, electric, pneumatic, hydraulic, etc.

The maneuvering actuator can more precisely be a double rod actuator or the equivalent. Each rod of the latter can be connected at its respective end, extending beyond the cylinder, to the connecting means, while the cylinder can be in a driving connection with the body. As a result, the cylinder can be translated relative to the connecting means and drive the body with which said cylinder is connected. The driving connection between the cylinder of the double rod maneuvering actuator and the body can be achieved by a rack connected to the cylinder and engaging with a toothed circular sector connected to the body and centered on the axis of the second joint.

According to a further characteristic of the invention, it is provided that the maneuvering actuator is a hydraulic actuator. In this case, the second inverter can comprise a loop which, in the first position of the second inverter, links the two chambers of the maneuvering actuator, thus allowing a pivoting of the body relative to the connecting means around the axis of the second joint. Moreover, the second locking means can comprise a pressure relief valve placed in parallel in the circuit of the maneuvering actuator by two lines.

It is also provided that the first end-of-travel element which acts on the control element of the first inverter is connected to the cylinder of the maneuvering actuator.

According to a further characteristic of the invention, it is provided that the positioning means also consists of at least one hydraulic actuator. The invention finds a particularly advantageous application in the field of mowers with or without elements for handling the cut product.

Accordingly, the present invention provides for a harvesting machine which comprises a body which rests on the ground both in a work position and in a transport position through at least one wheel. The at least one wheel being connected directly or indirectly to the body through a first joint with the first joint having an upwardly directed axis. The harvesting machine further comprises a first locking means for stopping the pivoting of the at least one wheel around the axis of the first joint and connecting means which is to be rigidly connected, at least during work, to a motor vehicle. The body being connected to the connecting means through a connecting device. The connecting device comprising a second joint having an upwardly directed axis. Also, the harvesting machine comprises a second locking means for stopping a pivoting of the body around the axis of the second joint.

The body is movable from a work position, in which a longitudinal axis of the body extends crosswise to a direction of work, to a transport position in which the longitudinal axis extends at least approximately parallel to a direction of transport such that:

at work, the second locking means stops the pivoting of the body around the axis of the second joint, while the at least one wheel is capable of pivoting around the axis of the first joint; and during transport, the first locking means stops the pivoting of the at least one wheel around the axis of the first joint, while the body is capable of pivoting around the axis of the second joint.

The harvesting machine further comprises orientation means for orienting for the transport the at least one wheel in the direction of transport.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
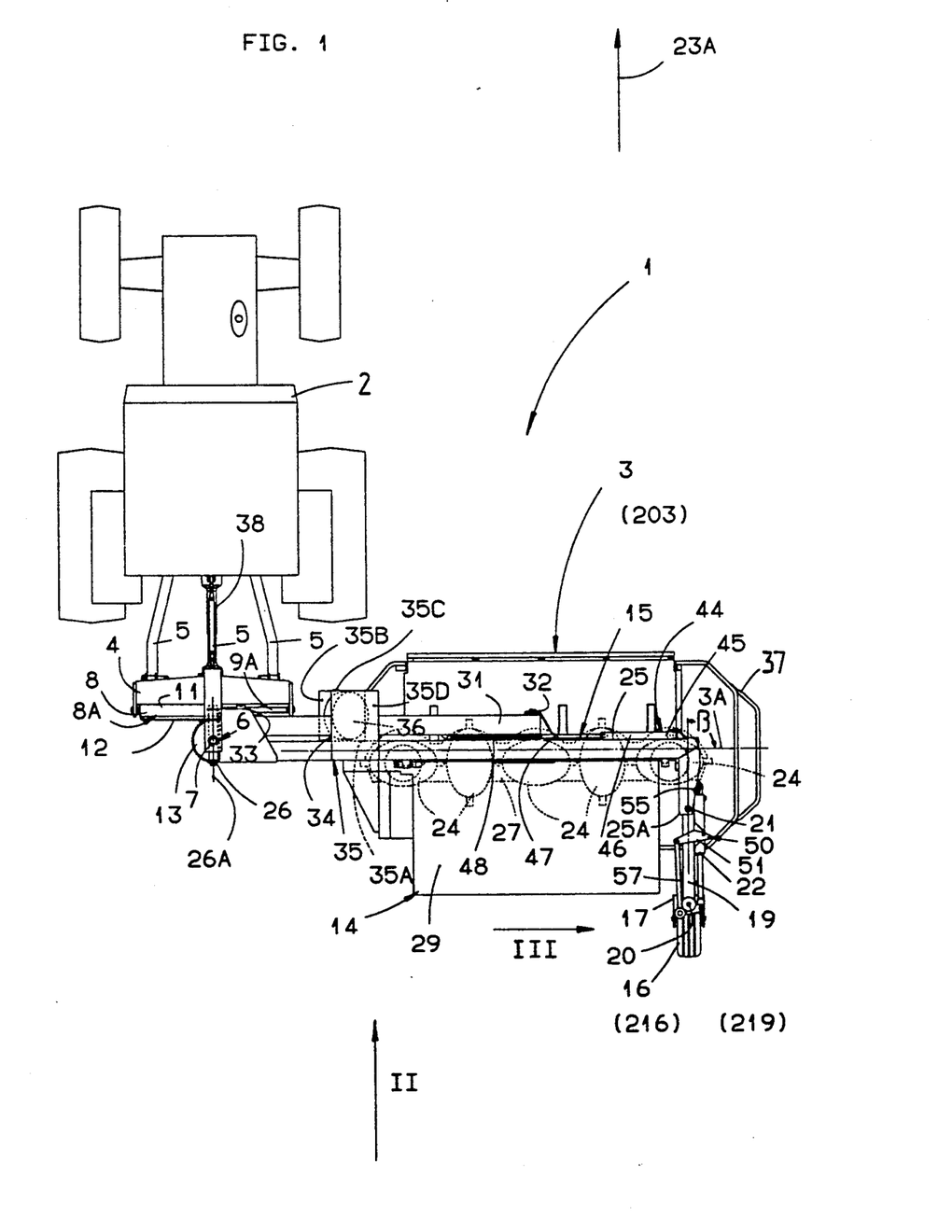
FIG. 1 represents a top view of a harvesting machine according to the invention connected to a farm tractor and placed in a work position.
Figure 2:
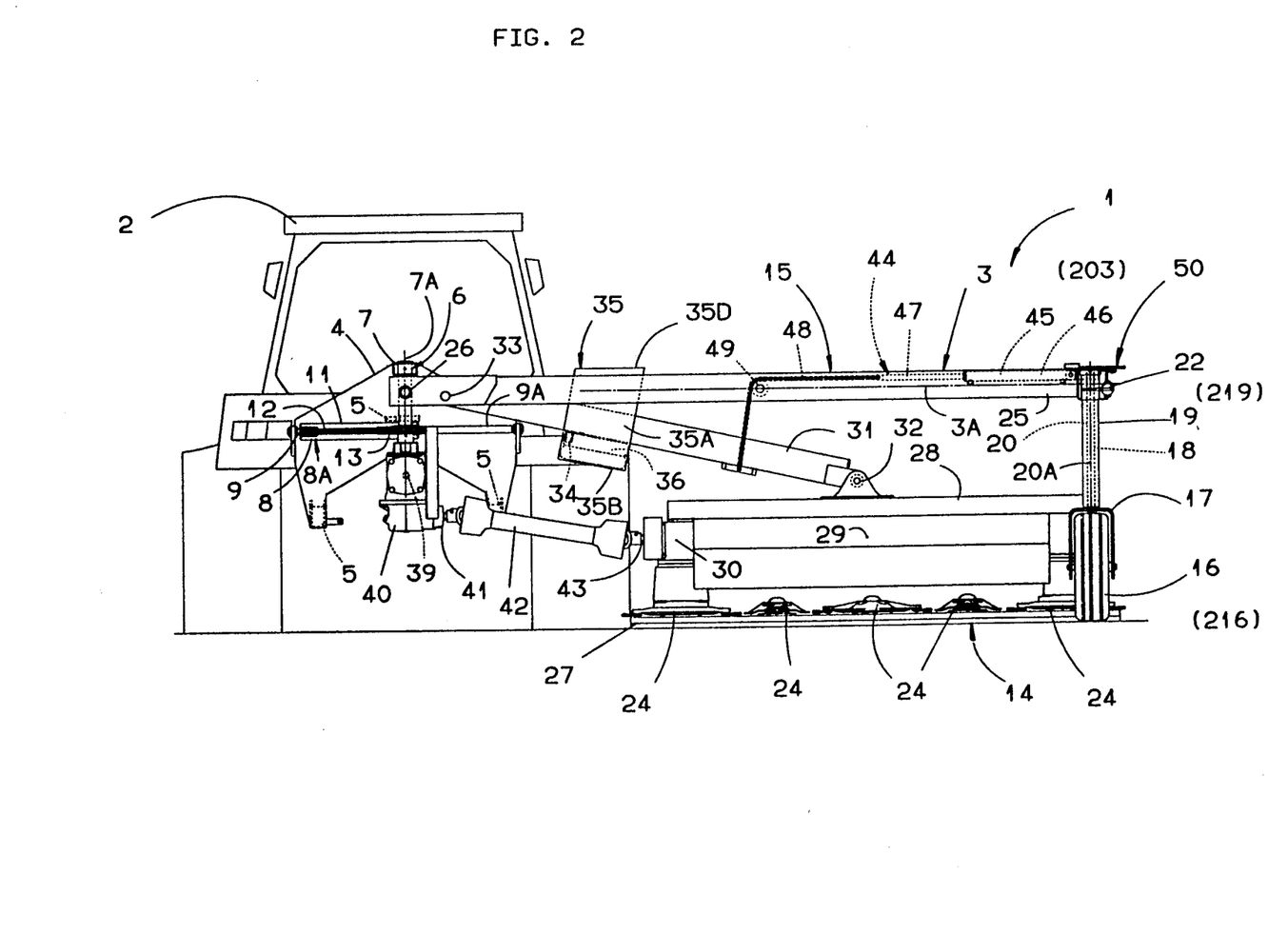
FIG. 2 represents a rear view of the harvesting machine without protective elements along arrow II defined in FIG. 1.
Figure 3:
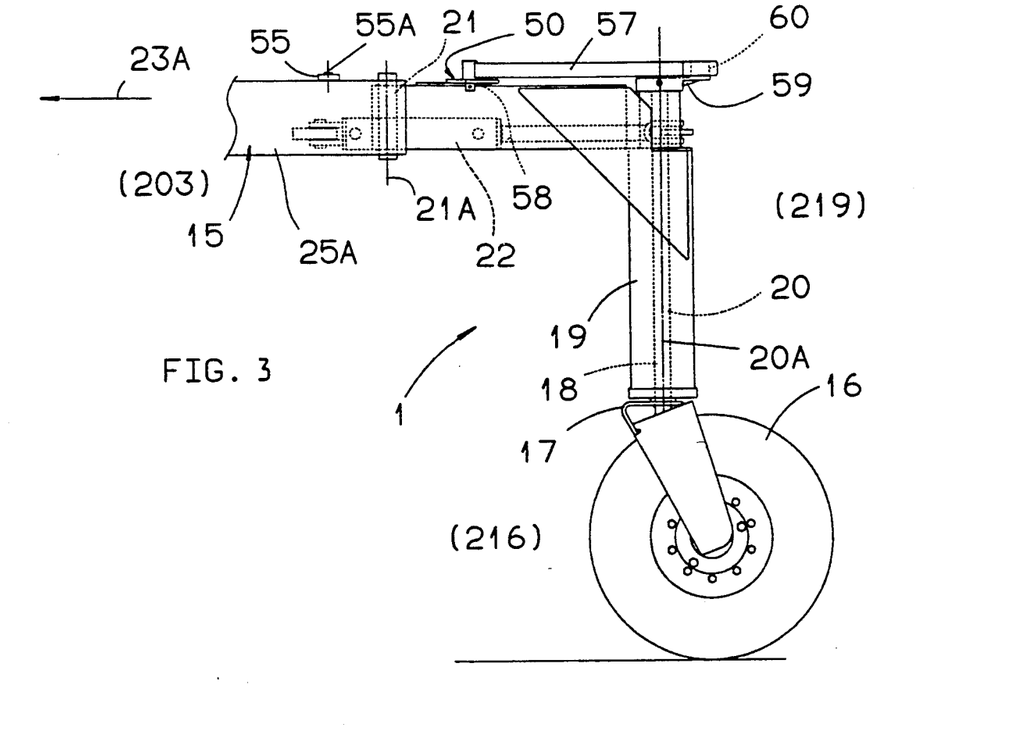
FIG. 3 represents a rear side view of the harvesting machine along arrow III defined in FIG. 1.

Referring now to the drawings wherein like reference numerals designate identical or corresponding parts throughout the several views, and more particularly to FIGS. 1-3 thereof, a mower (1) according to the invention is shown. The mower is hitched to a farm tractor (2).

Mower (1) comprises a body (3) and a hitching structure (4). Hitching structure (4) is intended to be connected, at its front part, to a three-point hitch (5) of the farm tractor (2). Body (3) is connected to hitching structure (4) by a connecting device (6) which comprises in particular a joint (7). The joint (7) allows a pivoting of body (3) around a geometric axis (7A) (FIG. 2) that is a least approximately vertical. The angular position of body (3) relative to hitching structure (4) can be modified by making body (3) pivot around vertical axis (7A) of connecting device (6). Placement into the desired angular position is achieved by a maneuvering actuator (8) and maintaining it in the latter is achieved by a locking device (8A). In this embodiment, locking device (8A) comprises, on the one hand, maneuvering actuator (8) which is a double rod hydraulic actuator (9, 9A) and, on the other hand, a control device (10)—whose description will be given later—which feeds in particular the actuator (8). Each rod (9, 9A) of the actuator (8) is connected rigidly at its respective end, extending beyond cylinder (11), to hitching structure (4), to make it possible for cylinder (11) of the actuator (8) to be translated horizontally under the action of the oil which feeds it. A rack (12), which engages with a cylindrical gear (13) whose axis of rotation is merged with vertical axis (7A) of connecting device (6), is connected rigidly to cylinder (11). Moreover, gear (13), which rotates around vertical axis (7A), is connected in rotation with body (3) of mower (1). As a result, body (3) can extend, by pivoting around vertical axis (7A) performed under the action of maneuvering cylinder (8), either in a work position (203) beside tractor (2) (FIGS. 1 and 2), or in a transport position (103) in the extension of tractor (2) (FIG. 5)

Further, body (3) of mower (1) comprises a harvesting mechanism (14) suspended from a frame (15). At its end distant from connecting device (6), frame (15) rests on the ground by a wheel (16) which rolls between the flanges of a yoke (17).

A journal (18), whose longitudinal axis extends upward, is connected rigidly on the top of yoke (17). A positioning arm (19) in the shape of a hollow bracket comprises, in its vertical part, journal (18). The connection of journal (18) with positioning arm (19) is achieved by a pivot-type joint (20) whose geometric axis (20A) is at least approximately vertical. At its longitudinal end opposite to journal (18), positioning arm (19) is connected to frame (15) by a joint (21). The latter is also of pivot type and its geometric axis (21A) extends at least approximately parallel to geometric axis (20A) of preceding pivot connection (20). As a result, the angular position of positioning arm (19) equipped with wheel (16) can be modified by making the arm (19) pivot relative to frame (15) around geometric axis (21A) of joint (21). Thus, positioning arm (19) makes it possible for wheel (16) to rotate partially around the end of harvesting mechanism (14) distant from tractor (2) to place the wheel (16) either in transport position (116) (FIG. 5) or in work position (216) (FIG. 1), in which it extends behind the center of gravity of body (3), taking into account the corresponding direction of advance (23 or 23A). In its transport position (119), positioning arm (19) aligns wheel (16) at least approximately with the center of gravity of body (3) and vertical axis (7A) of connecting device (6), and in its work position (219), positioning arm (19) places wheel (16) behind cutting elements (24) of mower (1). Placement into the desired position is performed by a hydraulic positioning actuator (22) which extends between frame (15) and positioning arm (19). The supply of actuator (22) and keeping arm (19) in the desired angular position are controlled, as for maneuvering actuator (8), by control device (10).

Figure 5:
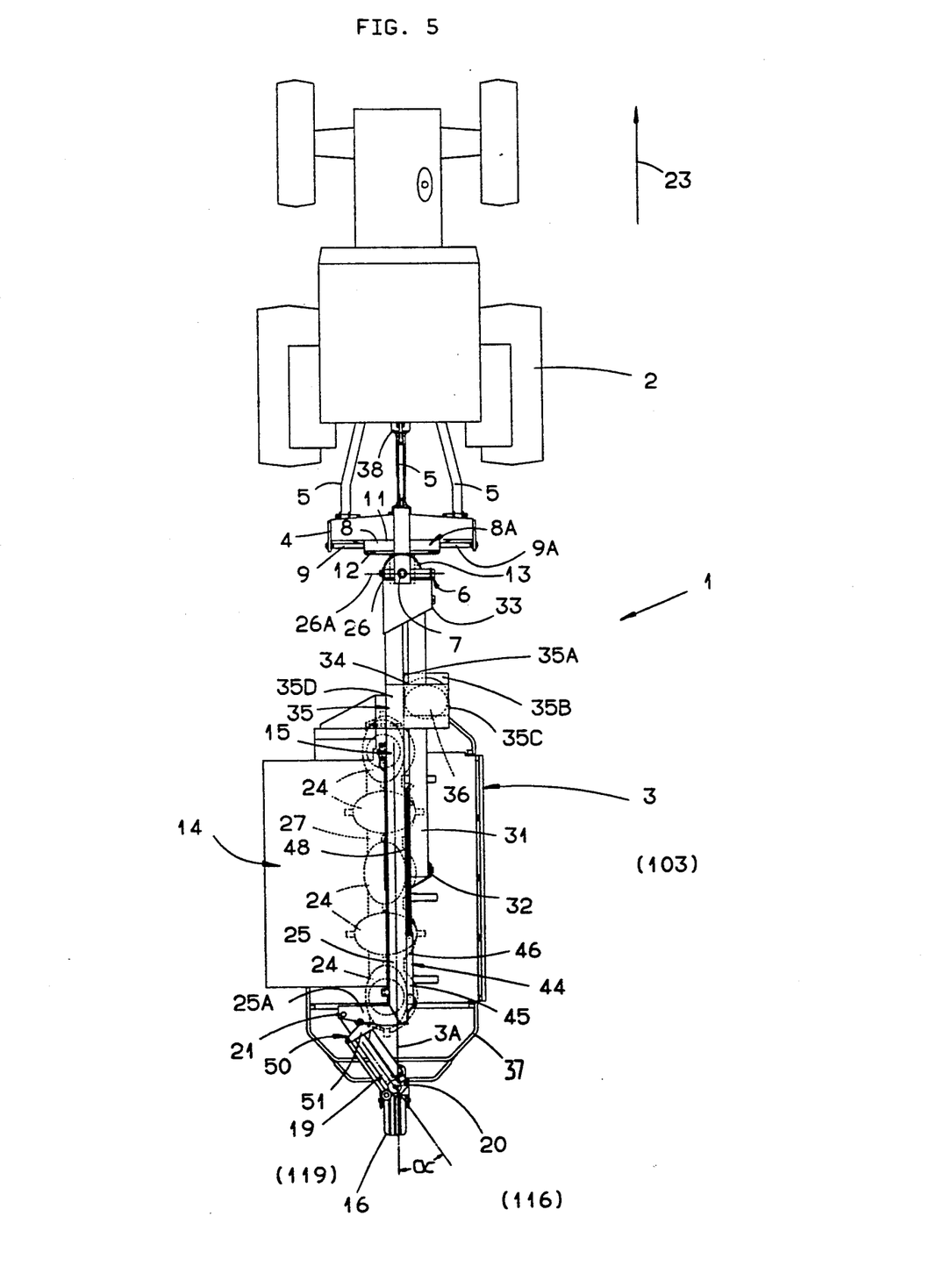
FIG. 5 represents a top view of the harvesting machine placed in the transport position.

In FIGS. 1, 2 and 5, the shape of frame (15) is shown. The latter essentially comprises a beam (25) which extends, at work, crosswise to direction of advance (23A) at work and, during transport, parallel to direction of advance (23) during transport. It is connected to hitching structure (4) by connecting device (6). In addition to joint (7) allowing a pivoting of body (3), or of frame (15), around its vertical axis (7A), connecting device (6) also comprises an additional joint (26) placed between preceding joint (7) of connecting device (6) and body (3). Geometric axis (26A) of the latter is at least approximately horizontal and extends orthogonally to longitudinal axis (3A) of body (3) to make it possible for frame (15) to pivot relative to hitching structure (4). Moreover, the horizontal axis (26A) is concurrent with vertical axis (7A) of connecting device (6). Such an arrangement makes it possible for wheel (16), or for body (3), to adapt to the contour of the ground by pivoting body (3) around the horizontal axis (26A) of connecting device (6). Further, frame (15) also comprises a bracket (25A). The latter extends crosswise to the longitudinal axis of beam (25) of frame (15) and is connected at the longitudinal end of beam (25), opposite to connecting device (6). Moreover, bracket (25A) of frame (15) comprises, at its free end opposite to beam (25), joint (21) connecting positioning arm (19) to frame (15). In top view, such an arrangement makes it possible for positioning arm (19), when it is in its transport position (119), to form an acute angle (α) with longitudinal axis (3A) of body (3), while in its work position (219), positioning arm (19) forms an at least approximately right angle (β) with the longitudinal axis (3A).

Harvesting mechanism (14) is known to one skilled in the art and extends under frame (15) in a direction crosswise to direction of advance (23A) at work. It essentially comprises a cutting bar (27) equipped with cutting elements (24), a carrying structure (28) (FIG. 2) to which processing elements (29) are hooked, and an intake housing (30). Intake housing (30) is connected to the longitudinal end of carrying structure (28) directed toward hitching structure (4) an is intended to drive cutting elements (24) and processing elements (29). Carrying structure (28) supporting processing elements (29) extends at least approximately parallel to cutting bar (27) above cutting elements (24). Processing elements (29) are placed behind cutting elements (24) for processing the product cut by the latter. Moreover, carrying structure (28) comprises protective elements (37) (FIGS. 1 and 5) which extend around cutting bar (27) and which are intended to protect the user or individuals who are in the vicinity.

A suspension arm (31) suspends harvesting mechanism (14) in frame (15). In this embodiment, suspension arm (31) is placed above harvesting mechanism (14) and extends in top view at least approximately parallel to beam (25) of frame (15) and in the vicinity of the latter. At one of its longitudinal ends, suspension arm (31) is connected to carrying structure (28) of harvesting mechanism (14), in the median part of the latter, by a pivot-type joint (32). The geometric axis of the joint (32) extends at least approximately in a vertical plane directed in direction of advance (23A) at work and containing the center of gravity of harvesting mechanism (14). Moreover, the geometric axis is at least approximately directed in the direction of advance (23A) at work. At its other longitudinal end, suspension arm (31) is connected to beam (25) of frame (15) by a joint (33) placed close to joint (7) with vertical axis (7A) connecting frame (15) to hitching structure (4). The joint (33) is of pivot type and its geometric axis is also directed at least approximately in direction of advance (23A) at work. As a result, suspension arm (31) allows only a movement of harvesting mechanism (14) in height, as well as a pivoting of the harvesting mechanism (14) relative to frame (15) around a direction at least approximately parallel to direction of advance (23A) at work. Due to this suspension arm (31), harvesting mechanism (14) can adapt to the configurations of the land and pass over the obstacles that the latter can present.

In FIGS. 1 and 2, it is also shown that suspension arm (31) is equipped with a roller (34). The latter is placed between two joints (32, 33) of suspension arm (31) and its axis of rotation intersects at least approximately the geometric axis of joint (33) connecting suspension arm (31) to frame (15). Roller (34) extends more precisely between suspension arm (31) and beam (25) of frame (15), to rest, by a support (35), against the beam (25). Due to this roller (34), the stress which opposes the sliding of harvesting mechanism (14) on the ground is transmitted, at least partly, by roller (34) to frame (15). As a result, suspension arm (31) can follow the movements in height of harvesting mechanism (14), joint (33) being relieved in any position of the arm (31).

In this embodiment, support (35) is placed in the vicinity of the median part of suspension arm (31) and comprises four plane parts (35A, 35B, 35C, 35D), the first (35A) of which is connected to the front side face of beam (25) of frame (15) and against which roller (34) comes to rest. Second part (35B) of this support (35) extends approximately parallel under suspension arm (31). Third part (35C) extends upward in front of suspension arm (31) relative to direction of advance (23A) at work, to form a "U" with preceding parts (35A, 35B). Fourth part (35D) extends horizontally and is connected to the upper face of beam (25) of frame (15). As a result, during movements in height of harvesting mechanism (14), suspension arm (31) moves inside support (35), while roller (34) rests against first part (35A) of the support (35).

A pneumatic spring (36), whose structure is shown in FIGS. 1, 2 and 5, is placed between suspension arm (31) and second part (35B) of support (35), which extends under suspension arm (31). In this way, pneumatic spring (36) supports, by suspension arm (31), a part of the weight of harvesting mechanism (14).

The driving of harvesting mechanism (14) is performed from the power takeoff (not shown) of tractor (2), which drives, by a telescopic shaft with universal joints (38), input shaft (39) (FIG. 2) of a movement transmission device (40). Output shaft (41) of movement transmission device (40), which pivots with body (3) around vertical axis (7A) of joint (7), is always oriented at least approximately parallel to longitudinal axis (3A) of body (3) and drives, by another telescopic shaft with universal joints (42), input shaft (43) of intake housing (30) of harvesting mechanism (14). Input shaft (43) is also oriented at least approximately parallel to longitudinal axis (3A) of body (3).

As shown in FIGS. 1, 2 and 5, mower (1) also comprises a lifting device (44) of harvesting mechanism (14). The lifting device (44) comprises a lifting actuator (45) whose cylinder (46) is connected to frame (15) and whose rod (47) is connected to a chain (48). The chain (48) winds partially on a wheel (49) (FIG. 2), guided in rotation in frame (15), and is connected at its end distant from lifting actuator (45) to suspension arm (31). At work, when rod (47) has come out, chain (48) is expanded and can be deformed freely, so that lifting device (44) does not interfere with the movement in height of harvesting mechanism (14) relative to frame (15). When harvesting mechanism (14) is to be lifted, it will be sufficient to make rod (47) return into cylinder (46) of lifting actuator (45) by injecting oil in the latter. By so doing, rod (47) pulls, via chain (48), on suspension arm (31), which has the effect of pivoting the arm (31) relative to frame (15) and of making harvesting mechanism (14) rise.

Figure 13:
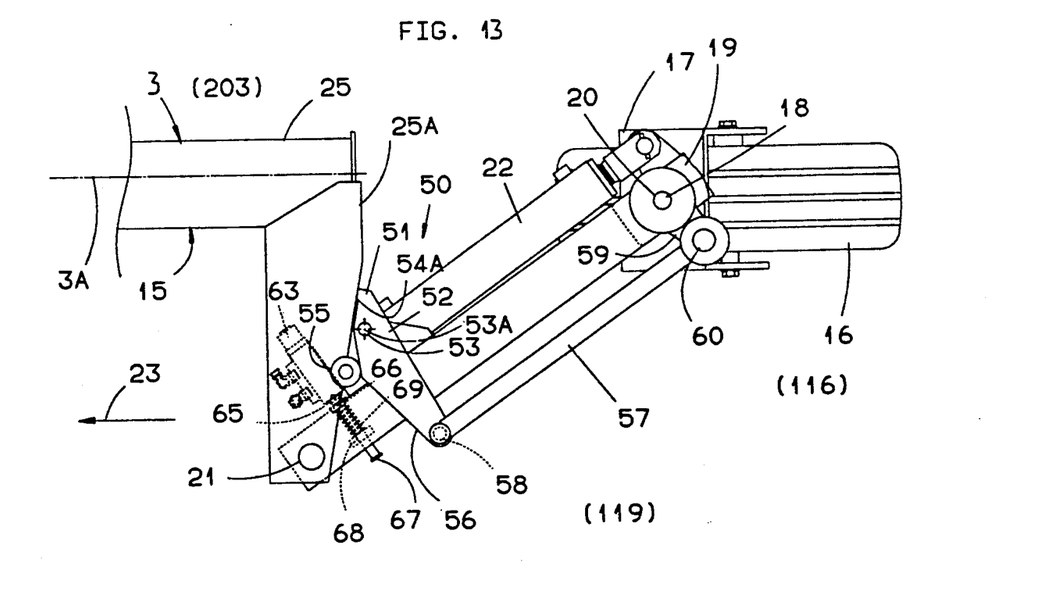
FIG. 13 represents, in top view, the locking device of the wheel when the harvesting machine is ready for transport.

In FIGS. 3, 7, 9 and 13, it is shown that the positioning arm (19) supports a locking device (50) of wheel (16) which comprises, in this embodiment, an orientation and locking element (51). The latter is a pivoting lever (52) connected to positioning arm (19) by a joint (53) placed in the vicinity of joint (21) connecting positioning arm (19) to frame (15). Geometric axis (53A) of the joint (53) extends at least approximately parallel to axis (20A) of joint (20) connecting wheel (16) to positioning arm (19). On both sides of joint (53), pivoting lever (52) exhibits two stops (54, 54A) which are intended, when positioning arm (19) returns to its transport position (119), to come into contact with bracket (25A) of frame (15). For this purpose, bracket (25A) of frame (15) is provided with a roller (55) rotating around a geometric axis (55A) at least approximately parallel to swivel pin (53A) of pivoting lever (52) and with which one (54) of stops (54, 54A) of pivoting lever (53) comes into contact. At its other end, pivoting lever (52) comprises an arm (56) to which a connecting rod (57) is connected by a joint (58) with geometric axis parallel to geometric axis (53A) of joint (53). In side view (FIG. 3), connecting rod (57) extends approximately parallel to the horizontal part of positioning arm (19) and is connected to an orientation arm (59) by a joint (60) with geometric axis also parallel to geometric axis (53A) of joint (53). The orientation arm (59) is connected rigidly, but in a detachable manner, to journal (18), which makes possible the pivoting of wheel (16). Due to this arrangement, the angular position of wheel (16) is a function of the angular position of stops (54, 54A) of pivoting lever (52), by arm (56) of pivoting lever (52), connecting rod (57) and orientation arm (59). In this way, when positioning arm (19) reaches transport position (119), stops (54, 54A) of pivoting lever (52) come to be oriented against bracket (25A) of frame (15) and thus places wheel (16) in direction of advance (23) during transport (FIGS. 5 and 13).

Figure 7:
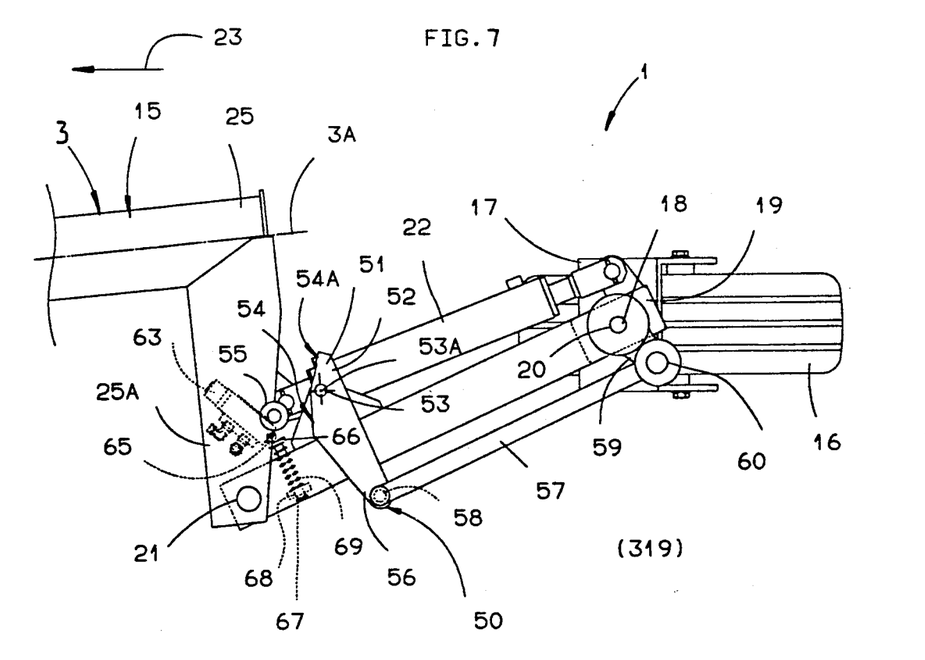
FIG. 7 represents, in top view, the locking device of the wheel when its action is neutralized and when the body of the harvesting machine is in a position close to its transport position.

Conversely, FIG. 7 shows that when the positioning arm is in an intermediate position (319) close to its transport position (119), stops (54, 54A) of pivoting lever (52) are no longer able to reach roller (55) or frame (15). As a result, pivoting lever (52) and wheel (16) can pivot around their respective vertical axis (53A, 20A), which makes it possible for wheel (16) to be oriented automatically as a function of its movement.

In FIGS. 4, 6, 8, 10, 11 and 12, the hydraulic wiring of control device (10) is shown. It is seen in particular in FIG. 4 that the oil is brought to maneuvering actuator (8) by two pairs of successive lines (61, 61A, 61B, 61C) which constitute the feed circuit of maneuvering actuator (8). The oil which feeds this circuit (61, 61A, 61B, 61C) is distributed by control device (10). The latter comprises two inverters (62, 63), the first (62) of which is connected to hitching structure (4) and the second (63) of which is connected to body (3) of machine (1). Each inverter (62, 63) is controlled by a corresponding control element (64, 65) represented by a pusher in the example described. First inverter (62), which is connected to hitching structure (4), extends more precisely in the vicinity of maneuvering actuator (8). Second inverter (63) is connected to bracket (25A) of frame (15), so that its control element (65), in particular during transport, can be actuated by an end-of-travel element (66) connected to positioning arm (19) (FIG. 13). For this purpose, end-of-travel element (66) is attached rigidly at the longitudinal end of a rod (67) directed, during transport, toward corresponding control element (65). The rod (67) is connected to positioning arm (19) by a sliding, pivot-type cylindrical joint (68) allowing in particular a translation of the rod (67) relative to positioning arm (19). A spring (69), placed between positioning arm (19) and end-of-travel element (66), makes it possible, by elastically deforming, for positioning arm (19) to continue its movement from its intermediate position (319) to its transport position (119) after end-of-travel element (66) is in contact with control element (65) of second inverter (63). Between intermediate position (319) and work position (219) of positioning arm (19), control element (65) of second inverter (63) is not actuated by end-of-travel element (66) and, as said above, wheel (16) can pivot around geometric axis (20A). If control element (65) of second inverter (63) is not actuated (FIGS. 8 to 11), the oil is distributed to circuit (61, 61A, 61B, 61C) of maneuvering actuator (8) described above.

Figure 4:
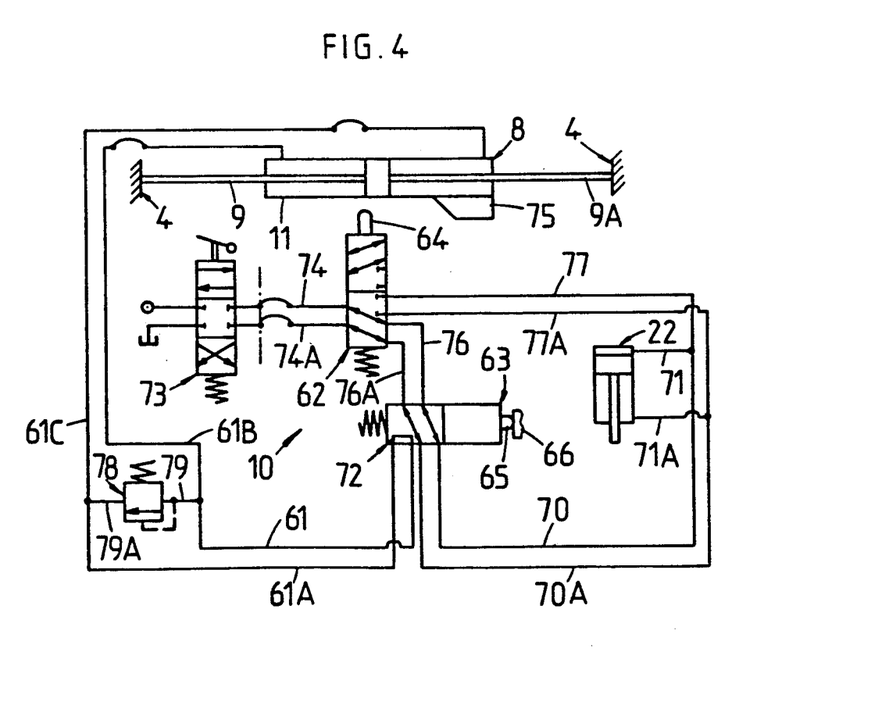
FIG. 4 represents the diagram of the hydraulic wiring of the control device when the harvesting machine is in transport position.

If, on the contrary, control element (65) is actuated by end-of-travel element (66), the oil is distributed by second inverter (63) to the circuit of positioning actuator (22). This circuit comprises in particular two pairs of lines (70, 70A, 71, 71A) which convey the oil between second inverter (63) and positioning actuator (22). To do this, the first pair of lines (70, 70A) brings the oil from second inverter (63) to second pair of lines (71, 71A), one (71) of which is connected to the large chamber of positioning actuator (22) and the other (71A) of which is connected to the small chamber of this same actuator (22). Further, it is also shown in FIG. 4 that second inverter (63) comprises a loop (72) which makes it possible, when control element (65) is actuated, to link two lines (61, 61A) of the circuit of maneuvering actuator (8). The oil of the two chambers of maneuvering actuator (8) with double rods (9, 9A) can circulate freely from one chamber to the other. This very advantageous arrangement allows, during transport, the pivoting of body (3) relative to hitching structure (4) around vertical axis (7A) of connecting device (6). Since wheel (16) is a guide during transport, the pivoting of body (3) makes it possible to reduce considerably the steering radius during the transport maneuvers.

First inverter (62) is also shown in FIG. 4. The supply of this inverter (62) is performed from a 4/3-type hydraulic distributor (73) belonging to tractor (2). A common feed circuit, consisting of a pair of lines (74, 74A), transmits the oil from distributor (73) to first inverter (62). Control element (64) of this inverter (62) can be actuated by an end-of-travel element (75) which is connected to cylinder (11) of maneuvering actuator (8). This control element (64) is actuated when body (3) of machine (1) reaches its work position (203). In any other case, control element (64) is not actuated by corresponding end-of-travel element (75). If control element (64) of this inverter (62) is not actuated, the oil is distributed by this same inverter (62) to a circuit which feeds second inverter (63). This feed circuit comprises two lines (76, 76A) which come to be connected to the input of second inverter (63) to bring it the oil distributed by first inverter (62).

Figure 12:
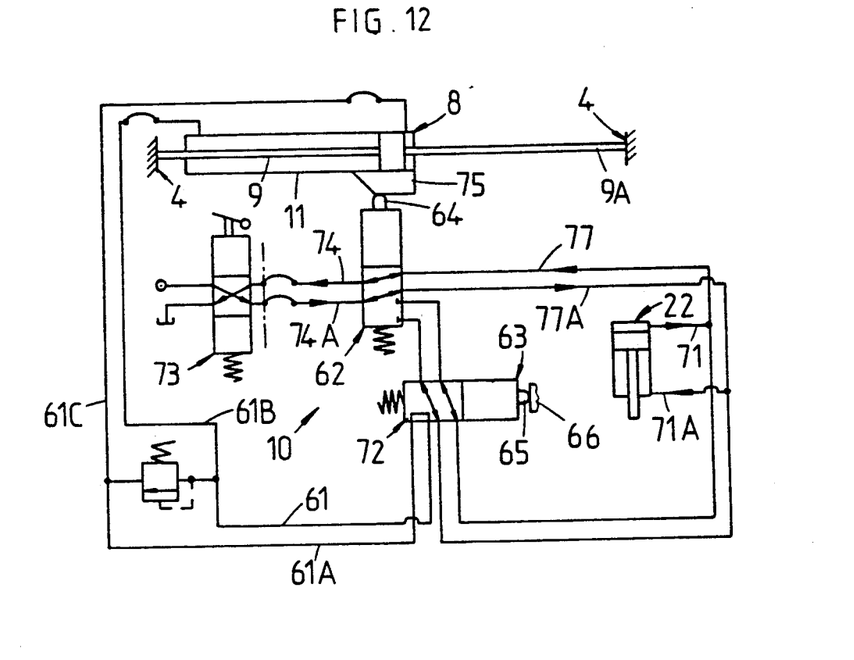
FIG. 12 represents the diagram of the hydraulic wiring of the control device when the wheel of the harvesting machine return to a transport position.

If, on the contrary, control element (64) is actuated by corresponding end-of-travel element (75), the oil is distributed by first inverter (62) to the circuit of positioning actuator (22) (FIG. 12). In this case, the oil is distributed to a pair of lines (77, 77A) which is mounted in parallel with the two other pairs of lines (70, 70A, 71, 71A) of this circuit of positioning actuator (22) and which brings the oil to the junction of the other pairs of lines (70, 70A, 71, 71A). Then, pair of lines (71, 71A) transmits the oil to positioning actuator (22).

Figure 11:
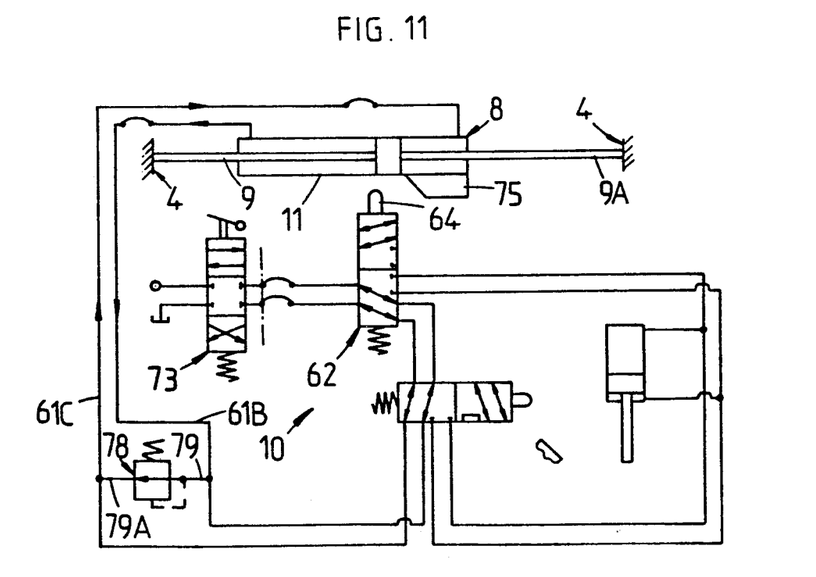
FIG. 11 represents the diagram of the hydraulic wiring of the control device when the pressure relief valve is released.

A pressure relief valve (78) is also shown in FIG. 4. A pair of lines (79, 79A), the first (79) of which is connected at the junction of line (61) with line (61B), and the second (79A) of which is connected at the junction of line (61A) with line (61C), brings the oil to pressure relief valve (78). The latter does not operate during the normal use of machine (1). Only when the pressure of the oil rises abnormally in first line (79) does pressure relief valve (78) allow the oil to flow through second line (79A) (FIG. 11).

As shown in FIGS. 1 and 5, the length of body (3) of machine (1) is clearly greater than its width. Since, moreover, body (3) extends, at work, beside tractor (2), it is impossible to transport machine (1) when it is in work position. It is therefore necessary to transpose machine (1) so that the longest dimension of its body (3) extends parallel to direction of transport (23). To do this, machine (1) should undergo transformations whose process is an object of this invention.

FIGS. 6 to 10 display the process of transformation of machine (1) according to the invention, to bring it from the transport position into the work position.

Figure 6:
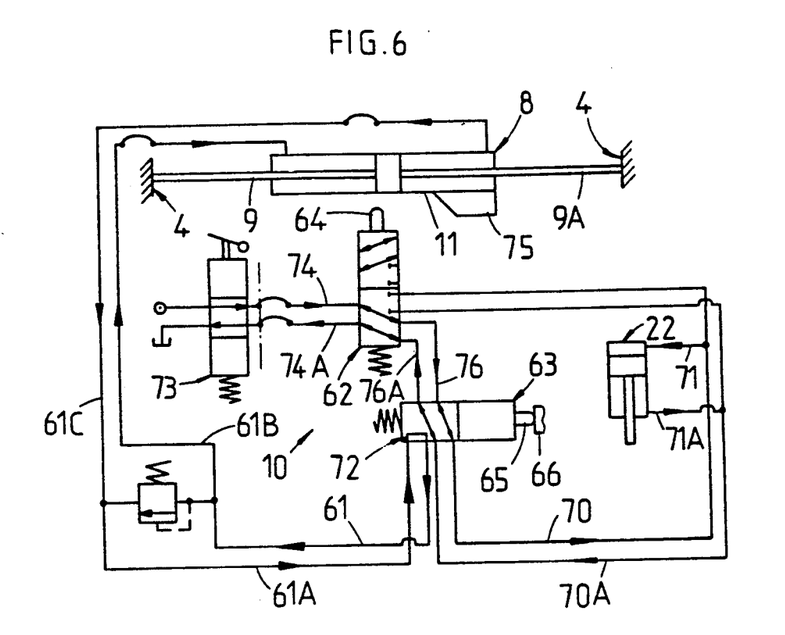
FIG. 6 represents the diagram of the hydraulic wiring of the control device when the action of the locking device of the wheel is going to be neutralized and when the body of the harvesting machine is in a position close to its transport position.

The first phase is represented in FIGS. 6 and 7. It comprises neutralizing the action of locking device (50) of wheel (16) to make possible a pivoting of the wheel (16) around axis (20A) directed upward. To do this, the user controls, by distributor (73) belonging to tractor (2), the extension of the rod of positioning actuator (22) which causes the slight pivoting of positioning arm (19) from its transport position (119) to its intermediate position (319) relative to body (3) of machine (1). The distributor (73) is actuated so that tractor (2) feeds the large chamber of positioning actuator (22) through line (74), first inverter (62), line (76), second inverter (63), line (70) and line (71). The oil contained in the small chamber of positioning actuator (22) returns to tractor (2), through line (71A), line (70A), second inverter (63), line (76A), first inverter (62) and line (74A). Under the action of the pivoting of the positioning element, wheel (16) draws back and body (3) starts to pivot slightly—around vertical axis (7A) of connecting device (6)—toward its work position (203). Gear (13), which is connected in rotation with body (3), engages with rack (12) of maneuvering actuator (8) and slightly translates cylinder (11) of the maneuvering actuator (8). By so doing, a part of the oil contained in the chamber of second rod (9A) of maneuvering actuator (8) is fed to the chamber of first rod (9), through line (61C), line (61A), loop (72), line (61) and line (61B). When positioning arm (19) reaches its intermediate position (319), stops (54, 54A) of pivoting lever (52) are no longer able to reach frame (15) (FIGS. 7 and 8) and corresponding end-of-travel element (66) stops actuating control element (65) of second inverter (63). The slide valve of the latter then changes position, which interrupts the supply of oil of positioning actuator (22) and immobilizes positioning arm (19) in its intermediate position (319). As in this position, pivoting lever (52) can no longer reach frame (15), wheel (16) can pivot around vertical axis (20A).

Figure 8:
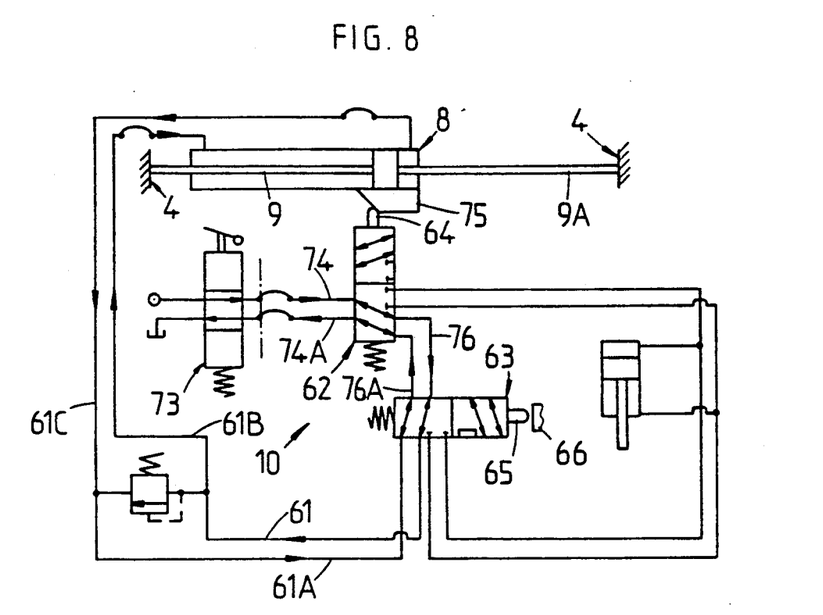
FIG. 8 represents the diagram of the hydraulic wiring of the control device when the body of the harvesting machine reaches the work position.
Figure 9:
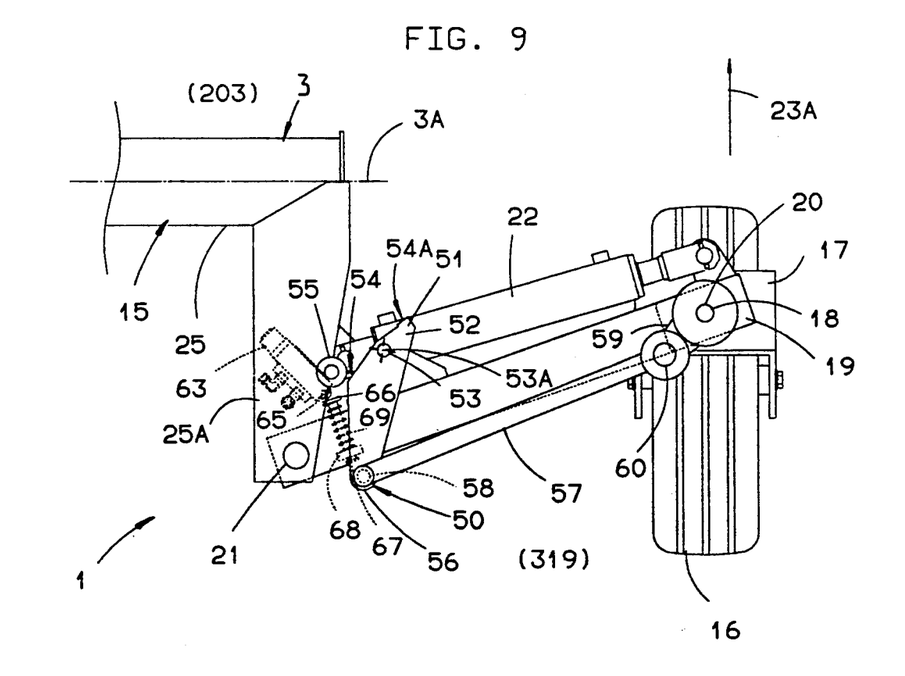
FIG. 9 represents, in top view, the locking device of the wheel when the body comes to be pivoted into a work position.
Figure 10:
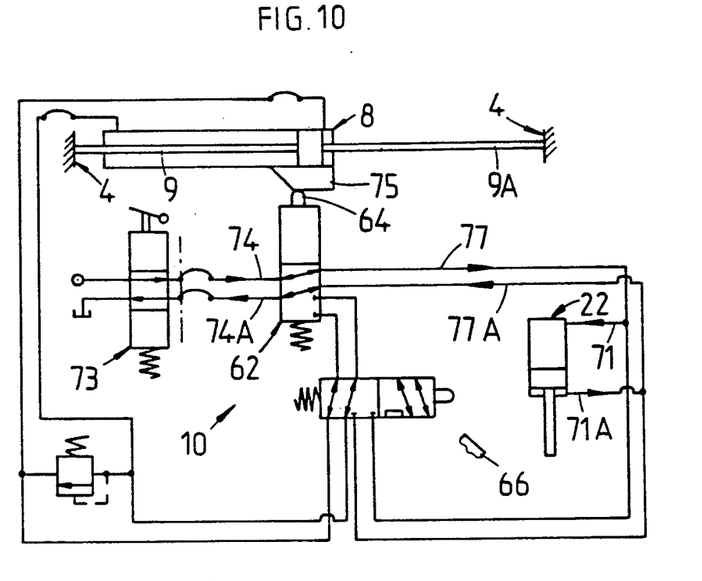
FIG. 10 represents the diagram of the hydraulic wiring of the control device when the body of the harvesting machine is in a work position and when the wheel reaches a work position.

The second phase is represented in FIGS. 8 and 9. It comprises performing the pivoting of body (3) which has slightly begun with the neutralization phase of locking device (50) of wheel (16), to bring the latter into its work position (203). To do this, second inverter (63)—whose slide valve comes to change position automatically—now controls the movement of cylinder (11) of maneuvering actuator (8) to cause, via rack (12) and gear (13), the pivoting of body (3) from its transport position (103) to its work position (203). For this purpose, the supply of maneuvering actuator (8) is performed through line (74), first inverter (62), line (76), second inverter (63), line (61) and line (61B). The oil contained in the other chamber of maneuvering actuator (8) returns to tractor (2) through line (61C), line (61A), second inverter (63), line (76A), first inverter (62) and line (74A). By so doing, body (3) pivots relative to hitching structure (4) around vertical axis (7A) of connecting device (6) toward its work position (203). When body (3) reaches its work position (203) (FIGS. 1, 2, 9 and 10), end-of-travel element (75) of maneuvering actuator (8) actuates control element (64) of first inverter (62). The slide valve of the latter then changes position, which interrupts the supply of oil of maneuvering actuator (8) and immobilizes body (3) in its work position (203).

The last phase is represented in FIGS. 1, 2, 3 and 10. It involves bringing, by positioning arm (19), wheel (16) into its work position (216). To do this, first inverter (62)—whose slide valve comes to change position automatically—again controls the extension of the rod of positioning actuator (22) which causes the pivoting of positioning arm (19) from its intermediate position (319) to its work position (219). The supply of the large chamber of this actuator (22) is performed through line (74), first inverter (62), line (77) and line (71). The oil contained in the small chamber returns to tractor (2) through line (71A), line (77A), first inverter (62) and line (74A). By so doing, positioning arm (19) pivots up to its work position (219). The latter is reached when, for example, the rod of positioning actuator (19) has extended to a maximum of the cylinder of the actuator (22). Machine (1) is then ready for work.

FIG. 11 displays the operation of pressure relief valve (78). The latter is used only during work and is stressed in particular when body (3) encounters an obstacle. In this case, body (3) has a tendency to pivot backward relative to direction of advance (23A) at work, which increases, via gear (13) and rack (12), the pressure of the oil contained in the chamber of maneuvering actuator (8) through which passes first rod (9), as well as in line (61B) and in line (79). As soon as the value of the oil pressure is greater than the value at which pressure relief valve (78) is set, the latter becomes conducting. Thus, the oil of excess pressure brought from the chamber of maneuvering actuator (8) through line (61B) and line (79) can then flow toward the other chamber of maneuvering actuator (8) containing second rod (9A) through pressure relief valve (78), line (79A) and line (61C). By so doing, body (3) pivots backward around vertical axis (7A) of connecting device (6) relative to hitching structure (4). To continue work, it is then sufficient to disengage machine (1) and to supply maneuvering actuator (8) to replace body (3) in its work position (203).

When the user wants to replace machine (1) from the work position into the transport position, it is sufficient to control, by distributor (73) belonging to tractor (2), the reentry of the rod of positioning actuator (22) (FIGS. 12 and 13). The distributor (73) is actuated so that tractor (2) feeds the small chamber of positioning actuator (22) through line (74A), first inverter (62), line (77A) and line (71A). The oil contained in the large chamber of the actuator (22) returns to tractor (2) through line (71), line (77), first inverter (62) and line (74). By so doing, positioning arm (19) pivots from its work position (219) up to its transport position (119), where locking device (50) orients and keeps wheel (16) in direction of advance (23) during transport. In this position, corresponding end-of-travel element (66) actuates control element (65) of second inverter (63) which links, by loop (72) and lines (61, 61A, 61B, 61C), the two chambers of maneuvering actuator (8). The body (3) can thus pivot around vertical axis (7A) of connecting device (6). Machine (1) is then ready for transport (FIGS. 4, 5 and 13).

Although this had not been mentioned, inverters (62, 63) return, of course, to their neutral position when they are not actuated and, in a known manner, by a respective spring integrated in the inverters (62, 63).

Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A harvesting machine comprising:
    a body which rests on the ground both in a work position and in a transport position through at least one wheel, said at least one wheel being connected directly or indirectly to said body through a first joint, said first joint having an upwardly directed axis;
    a first locking means for stopping a pivoting of said at least one wheel around the axis of said first joint;
    connecting means which is to be rigidly connected, at least during work, to a motor vehicle, said body being connected to said connecting means through a connecting device, said connecting device comprising a second joint having an upwardly directed axis; and
    a second locking means for stopping a pivoting of said body around the axis of said second joint; wherein:
    said body is movable from a work position, in which a longitudinal axis of said body extends crosswise to a direction of work, to a transport position in which said longitudinal axis extends at least approximately parallel to a direction of transport, such that:
    at work, said second locking means stops the pivoting of the body around the axis of said second joint, while said at least one wheel is capable of pivoting around the axis of said first joint; and
    during transport, said first locking means, stops the pivoting of said at least one wheel around the axis of said first joint, while said body is capable of pivoting around the axis of said second joint;
    wherein said harvesting machine further comprises orientation means for orienting, for the transport of said harvesting machine, said at least one wheel in the direction of transport.

2. The harvesting machine according to claim 1, wherein the axis of said first joint is at least approximately parallel to the axis of said second joint.

3. The harvesting machine according to claim 1, wherein the connecting device comprises a third joint having an axis directed at least approximately at right angles to the axis of said second joint and to the longitudinal axis of said body.

4. The harvesting machine according to claim 3, wherein the axis of said second joint and the axis of said third joint are concurrent.

5. The harvesting machine according to claim 3, wherein the third joint is provided between the body and the second joint.

6. The harvesting machine according to claim 1, further comprising maneuvering means for pivoting the body from its transport position to its work position, around the axis of said second joint.

7. The harvesting machine according to claim 6, wherein said second locking means comprises said maneuvering means.

8. The harvesting machine according to claim 1, wherein the connecting means comprises a hitching structure with a three-point hitch for connection to three points of a hitching device of the motor vehicle.

9. The harvesting machine according to claim 1, further comprising work elements for cutting a product, wherein in the work position, said at least one wheel extends behind at least one part of the work elements.

10. The harvesting machine according to claim 1, further comprising positioning element for bringing said at least one wheel from a work position to a transport position.

11. The harvesting machine according to claim 10, wherein said positioning element positions said at least one wheel, for transporting, at least approximately in the longitudinal extension of the body 12. The harvesting machine according to claim 10, wherein said positioning element comprises an arm at one of the ends of which said at least one wheel is connected by said first joint, said arm being connected to the body by a fourth joint having an upwardly directed axis.

13. The harvesting machine according to claim 12, wherein the upwardly direct axes of said first, said second and said fourth joints are at least approximately parallel to one another.

14. The harvesting machine according to claim 12, wherein the axis of said fourth joint which connects the positioning arm to the body, extends, in top view, behind the longitudinal axis of said body when the body is in its work position.

15. The harvesting machine according to claim 14, wherein the positioning arm forms, in top view, an acute angle (α) with the longitudinal axis of the body when the body latter is in the transport position, and an at least approximately a right angle (β) with said longitudinal axis of the body when the body is in the work position.

16. The harvesting machine according to claim 12, further comprising positioning means for pivoting the positioning arm from its transport position to its work position, around the axis of the fourth joint.

17. The harvesting machine according to claim 16, further comprising:
- maneuvering means for pivoting the body from its transport position to its work position, around the axis of the second joint; and
- a control device for controlling the maneuvering means and the positioning means.

18. The harvesting machine according to claim 17, wherein the control device comprises two inverters, each equipped with a respective control element, the first inverter being fed by a common circuit and being able to occupy two separate positions:
- a first position in which it feeds a feed circuit of the second inverter; and
- a second position in which it feeds a circuit of the positioning means;

the second inverter being able to occupy two separate positions:
- a first position in which it feeds a circuit of positioning means; and
- a second position in which it feeds a circuit of the maneuvering means;
- a first end-of-travel element being provided to act directly or indirectly on the control element of the first inverter and a second end-of-travel element being provided to act directly or indirectly on the control element of the second inverter.

19. The harvesting machine according to claim 18, wherein when the body reaches its work position, the first end-of-travel element acts on the control element of the first inverter and places said first inverter in its second position.

20. The harvesting machine according to claim 18, wherein when the positioning arm leaves its transport position, the second end-of-travel element no longer acts on the control element of the second inverter which then takes its place in its second position.

21. The harvesting machine according to claim 20, wherein the second end-of-travel element is connected to the positioning arm and wherein a compensation element is provided to permit the positioning arm to continue its travel to its transport position after the second end-of-travel element is in contact with the control element of the second inverter.

22. The harvesting machine according to claim 21, wherein the compensation element comprises an elastically deformable element placed between the second end-of-travel element and the positioning arm.

23. The harvesting machine according to claim 1, wherein the orientation means forms part of the first locking means intended to stop the pivoting of the at least one wheel around the axis of said first joint.

24. The harvesting machine according to claim 1, wherein the orientation means of said at least one wheel comprises a pivoting lever which pivots around a swivel pin which exhibits two stops extending on both sides of the swivel pin and intended to come into contact with an element of the body under the action of a positioning means.

25. The harvesting machine according to claim 24, wherein the contact between the pivoting lever and the element of the body is achieved by a roller rotating around an axis at least approximately parallel to the swivel pin of the pivoting lever.

26. The harvesting machine according to claim 24, wherein the swivel pin of the pivoting lever extends at least approximately in the same direction as the axis of said first joint.

27. The harvesting machine according to claim 26, wherein:
(a) the positioning element comprises a positioning arm at one of the ends of which the at least one wheel is connected by the first joint, said positioning arm being connected to the body by a fourth joint having an upwardly directed axis; and
(b) the orientation means of said at least one wheel is intended to come into contact with an element of the body when the positioning arm comes to its transport position.

28. The harvesting machine according to claim 24, wherein the pivoting lever is connected to the positioning arm.

29. The harvesting machine according to claim 28, wherein the pivoting lever is connected to the positioning arm in a vicinity of the fourth joint.

30. The harvesting machine according to claim 28, wherein the pivoting lever comprises an arm to which is connected a connecting rod, the connecting rod being connected to an orientation arm which is connected to a journal whose longitudinal axis defines the axis of the first joint.

31. The harvesting machine according to claim 6, wherein said maneuvering means comprises a cylinder and at least one maneuvering actuator.

32. The harvesting machine according to claim 31, wherein the maneuvering actuator is a double rod actuator.

33. The harvesting machine according to claim 32, wherein each rod of the double rod actuator of the maneuvering actuator is connected, at its respective end extending beyond the cylinder, to the connecting means, and said cylinder is in driving connection with the body.

34. The harvesting machine according to claim 33, wherein the driving connection between the cylinder of the maneuvering actuator with the double rod actuator and the body is achieved by a rack means connected to said cylinder, which engages with a toothed circular sector connected to the body and centered on the axis of the second joint.

35. The harvesting machine according to claim 32, wherein the maneuvering actuator is a hydraulic actuator.

36. The harvesting machine according to claim 35, wherein:
(a) a positioning arm is provided, intended to bring the at least one wheel from a work position into a transport position at one of the ends of which the at least one wheel is connected by the first joint, said positioning arm being connected to the body by a third joint having an upwardly directed axis;
(b) the pivoting of the positioning arm, from its work position to its transport position, around the axis of the third joint, is performed under the action of a positioning means;

(c) a control device controls the maneuvering actuator and the positioning means; and (d) the control device comprises two inverters, each equipped with a respective control element, a first inverter being fed by a common circuit and able to occupy two separate positions:

a first position in which it feeds a feed circuit of the second inverter; and a second position in which it feeds a circuit of the positioning means;

the second inverter also able to occupy two separate positions:

a first position in which it feeds a circuit of the positioning means; and a second position in which it feeds a circuit of the maneuvering actuator; a first end-of-travel element being provided to act directly or indirectly on the control element of the first inverter and a second end-of-travel element being provided to act directly or indirectly on the control element of the second inverter.

37. The harvesting machine according to claim 36, wherein the second inverter comprises a loop which, in the first position of said second inverter, links two chambers of the maneuvering actuator, thus allowing a pivoting of the body relative to the connecting means around the axis of the second joint.

38. The harvesting machine according to claim 37, wherein the second locking means comprises a pressure relief valve placed in parallel in the circuit of the maneuvering actuator by two pneumatic lines.

39. The harvesting machine according to claim 36, wherein the first end-of-travel element is connected to the cylinder of the maneuvering actuator.

40. The harvesting machine according to claim 16, wherein the positioning means consists of at least one hydraulic actuator.

41. The harvesting machine according to claim 1, wherein the harvesting machine is a mower with or without elements for handling the cut product.

* * * * *